United States Patent
Montz et al.

(10) Patent No.: US 8,331,913 B2
(45) Date of Patent: Dec. 11, 2012

(54) OBTAINING A SET OF SUBSCRIBER INFORMATION FROM A GENERIC SET OF SUBSCRIBER INFORMATION

(75) Inventors: Mark Montz, Elkhorn, NE (US); Karen Hennigan, Omaha, NE (US); Tiffany Moore, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 567 days.

(21) Appl. No.: 12/508,692

(22) Filed: Jul. 24, 2009

(65) Prior Publication Data

US 2011/0021179 A1  Jan. 27, 2011

(51) Int. Cl.
*H04M 3/42* (2006.01)

(52) U.S. Cl. .................. 455/414.1; 455/432.1; 370/259; 370/260; 370/261; 370/270

(58) Field of Classification Search ................ 455/414.1
See application file for complete search history.

(56) References Cited

U.S. PATENT DOCUMENTS

2010/0062762 A1\* 3/2010 Muratore et al. .......... 455/432.1

\* cited by examiner

*Primary Examiner* — Dwayne Bost
*Assistant Examiner* — Gerald Johnson

(57) ABSTRACT

There is provided a method, in a communications network, of obtaining a set of subscriber information for a subscriber. The method comprises receiving a request to obtain a set of subscriber information for a subscriber, obtaining a generic set of subscriber information, and deriving, from the generic set of subscriber information, a set of subscriber information for the subscriber.

9 Claims, 3 Drawing Sheets

OBTAINING A SET OF SUBSCRIBER INFORMATION FROM A GENERIC SET OF SUBSCRIBER INFORMATION

BACKGROUND

The use of CAMEL (customized applications for mobile network enhanced logic) enables communication network operators, such as GSM or 3G network operators, to provide a wide range of enhanced services that are not provided for by the core communication network. CAMEL services are provided by appropriate service platforms, and enables network operators to provide subscribers with specific services both within, and when roaming outside, the home communication network.

If a functional entity of a mobile network, such as a visited MSC (VMSC), a gateway mobile switching center (GMSC) or a serving GPRS support node (SGSN), supports CAMEL functionality the home location register (HLR) in the mobile network is configured with appropriate CAMEL subscriber information (CSI).

When a CAMEL subscriber attempts to register in an appropriate functional entity of a mobile network, such as in a VMSC or SGSN, the functional entity sends a registration request to the HLR. The registration request includes an identifier of the subscriber.

The HLR then retrieves a set of CAMEL subscriber information (CSI) for the particular set of CAMEL services to which the registering subscriber has access.

Each CSI, however, comprises a large and complex set of data that define numerous network and service parameters.

In small networks, the provisioning to a functional entity, of the set of CSI for each subscriber is generally manageable. However, in large networks having, for example, functional entities, such as multiple HLRs, and multiple service platforms, the management and provisioning of the CSI data becomes problematic.

BRIEF DESCRIPTION OF DRAWINGS

Embodiments of the invention will now be described, by way of non-limiting example only, with reference to the accompanying drawings, in which.

SUMMARY OF THE INVENTION

According to one aspect of embodiments of the present invention, there is provided a method, in a communications network, of obtaining a set of subscriber information for a subscriber. The method comprises receiving a request to obtain a set of subscriber information for a subscriber, obtaining a generic set of subscriber information, and deriving, from the generic set of subscriber information, a set of subscriber information for the subscriber.

According to a second aspect of embodiments of the present invention, there is provided apparatus, for deriving subscriber information for a subscriber. The apparatus comprises processing logic to receive a request to obtain a set of subscriber information for a subscriber, the request including a subscriber identifier, and a mapping module. The mapping module is configured to obtain a generic set of subscriber information, and to derive, from the generic set of subscriber information, a set of subscriber information for the subscriber.

According to a third aspect of embodiments of the present invention, there is provided a computer implemented method, stored on a carrier, for obtaining a set of subscriber information for a subscriber. The computer implement method, when executed performs the steps of receiving a request to obtain a set of subscriber information for a subscriber, obtaining a generic set of subscriber information, and deriving, from the generic set of subscriber information, a set of subscriber information for the subscriber.

DETAILED DESCRIPTION

The main CAMEL subscriber information are: Originating CSI (O-CSI), Dialed Service CSI (D-CSI), Network Service CSI (N-CSI), Translation Information Flag CSI (TIF-CSI), Terminating CSI (T-CSI), VMSC Terminating CSI (VT-CSI), and Trunk Originated CSI (TO-CSI). Further details of CAMEL and the CSIs are described in the 3GPP document TS 23.078.

Each CSI comprises a large and complex set of data that define numerous network and service parameters.

O-CSI, for example, defines:
a list of triggering detection points, indicating on which detection points triggering shall take place;
a gsmSCF (Service Control Function) address, indicating the address of a service platform providing the service for a particular subscriber;
service keys, indicating service logic to be used by the service platform;
default call handling data;
detection point criteria;
CAMEL capability handling, indicating the phase of CAMEL which the service platform requires;
CSI state data, indicating whether the O-CSI is active; and
a notification flag.

Figure 1:
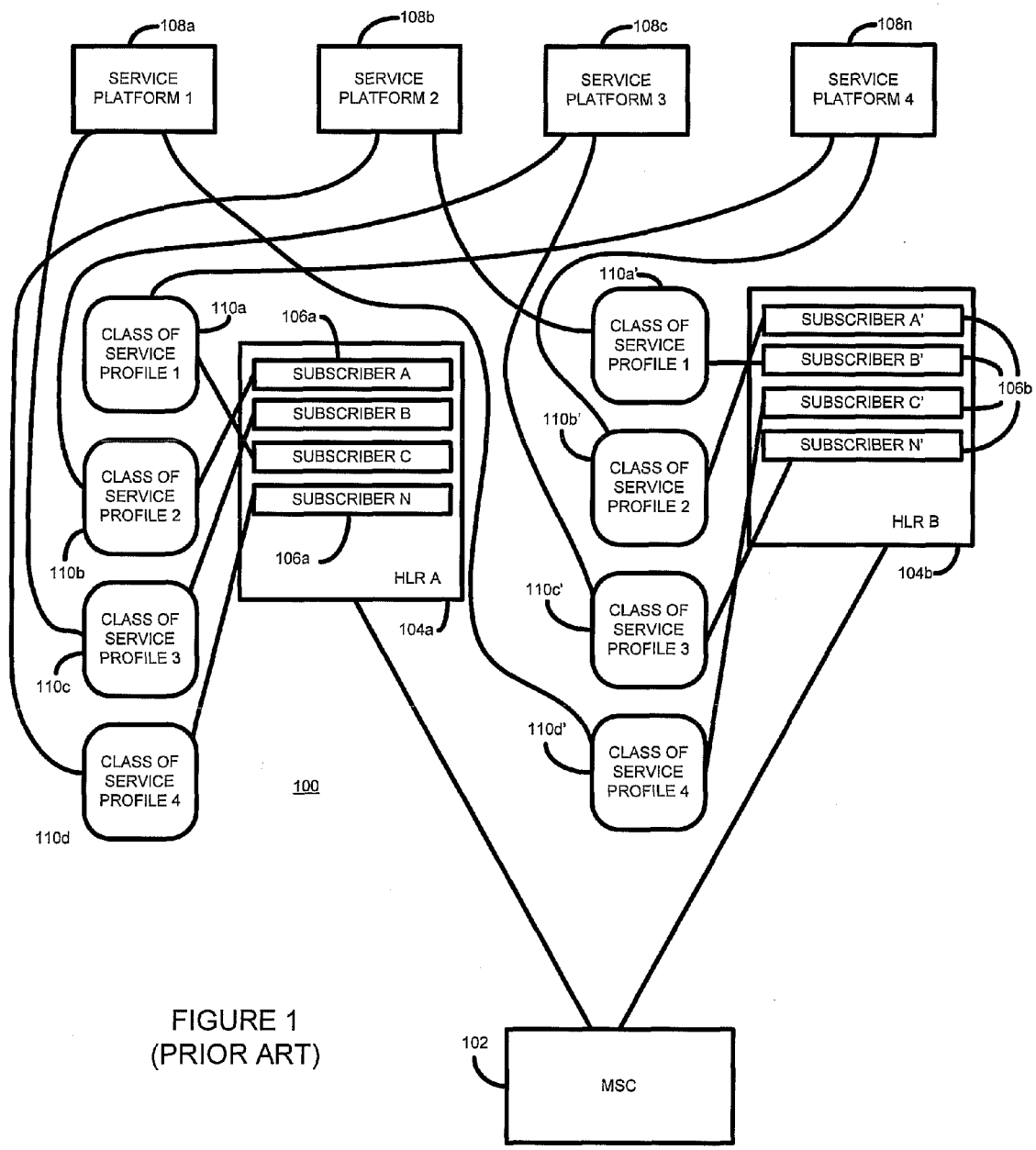
FIG. 1 is a block diagram of a mobile communication network according to the prior art.

Referring now FIG. 1 there is shown a block diagram of a mobile communication network 100 according to the prior art. In the following description like reference numerals indicate similar, but not necessarily identical, elements.

The network 100 supports a large number of subscribers such that it is impractical to all the subscribers served by a single home location register (HLR) and by a single CAMEL service platform (gsmSCF).

The network 100 comprises a pair of home location registers 104a and 104b. HLR 104a is configured with a subscriber profile 106a of subscribers A to N and HLR 104b is configured with details 106b of subscribers A' to N'.

For the purposes of explanation, it is assumed that HLRs 104a and 104b each support 500 000 subscribers.

Each subscriber profile in HLR 104a is associated with a class of service (COS) profile 110a, 110b, 110c, and 110d, stored in the HLR 104a, and each subscriber in HLR 104b is associated with a class of service profile 110a', 110b', 110c', and 110d', stored in the HLR 104b.

Each class of service profile comprises a set of CAMEL CSI data, as described above.

The network 100 further comprises a number of service platforms 108a to 108n. Each service platform (gsmSCF) provides a CAMEL service for a number of the network subscribers. For the purposes of explanation, it is assumed that each of the service platforms 108a to 108n supports up to 250,000 subscribers.

The CSI information configured in each class of service profile in each HLR is substantially the same, except for the address of the service platform providing the CAMEL service to the subscribers associated with that class of service profile. In this way, the allocation of subscribers to CAMEL service platforms is essentially static.

One of the problems this creates, however, is that, as previously described, the CAMEL CSI data is large and complex in nature. Furthermore, each class of service profile must be generated and configured in each HLR, but must be modified taking into account the specific service platforms to be used by specific subscribers. Not only is this problematic and cumbersome, but it is also inflexible. For example, if the network operator were to replace two existing service platforms by a high capacity service platform, the class of service profiles in each HLR would need to be modified to appropriately distribute all of the subscribers to an appropriate service platform. In large networks having, for example, many tens of HLRs and service platforms the management and configuration of the CSI data is unduly complex.

When a CAMEL subscriber attempts to register in an appropriate functional entity of a mobile network, such as in an MSC 102, the MSC 102 sends a registration request to the HLR with which the subscriber is associated. The registration request includes an identifier of the subscriber.

For example, if the subscriber 'B' attempts to register at the MSC 102, the MSC 102 requests the HLR 104*a* to provide it with the CSI data for subscriber 'B'. The HLR 104*a* obtains the appropriate class of service profile, and sends the associated CSI data to the MSC 102. The MSC 102 then uses the CSI data when processing messages associated with the subscriber.

Figure 2:
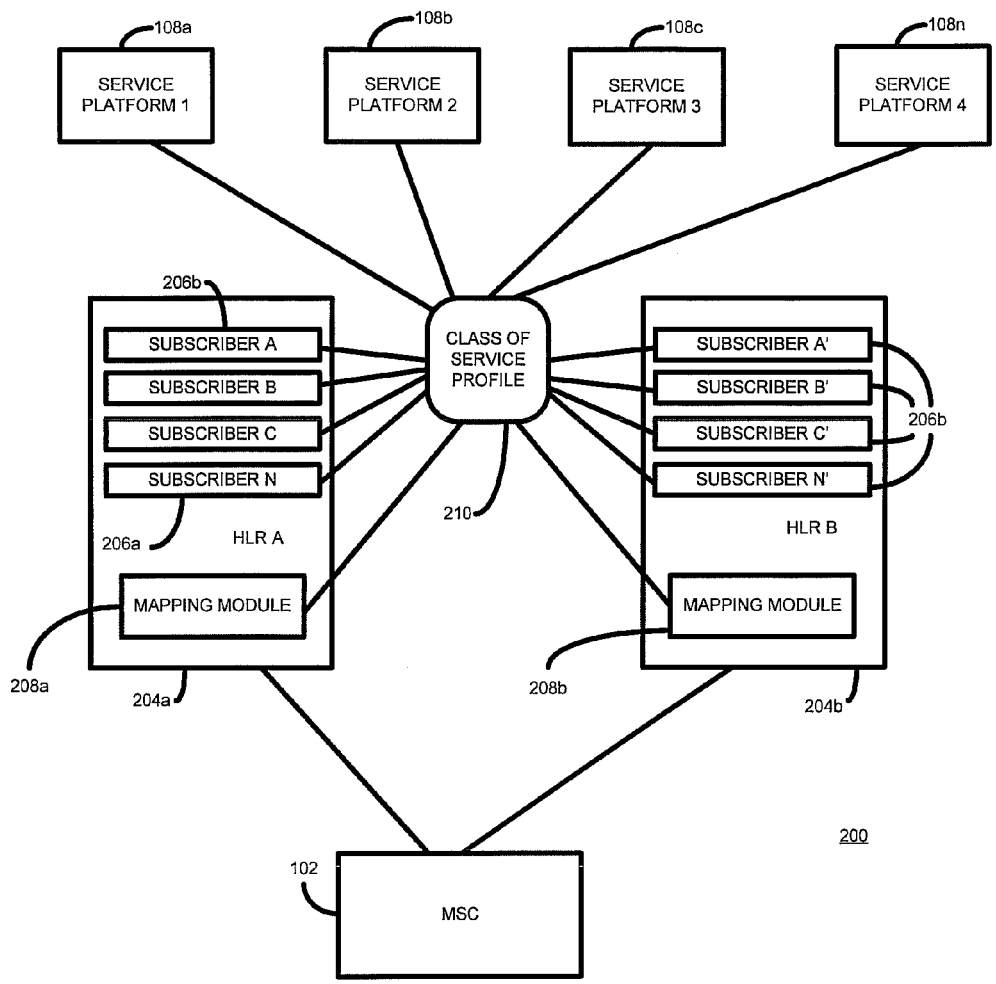
FIG. 2 is block diagram of a mobile communication network according to an embodiment of the present invention.

Referring now to FIG. 2, there is shown a mobile communication network 200 according to an embodiment of the present invention. A pair of HLRs 204*a* and 204*b* are shown each serving, in the present example, 500,000 subscribers. In one embodiment the HLRs 204*a* and 204*b* are implemented on a computer having a processor and being configured with suitable programming instructions to cause the computer to perform the task of a home location register.

Service platforms 108*a* to 108*n* each provide CAMEL services for 250,000 subscribers.

In the present embodiment, a single class of service profile 210 is associated with each of the subscriber profiles 206*b*. The class of service profile 210 may be, for example, stored in an appropriate network storage device accessible to each HLR 204*a* and 204*b* in the network 200. In an alternative embodiment, the class of service profile may be locally stored within each HLR.

The class of service profile 210 of the present embodiment comprises a set of CAMEL CSI data. For example, the class of service profile may comprise any of Originating CSI (O-CSI), Dialed Service CSI (D-CSI), Network Service CSI (N-CSI), Translation Information Flag CSI (TIF-CSI), Terminating CSI (T-CSI), VMSC Terminating CSI (VT-CSI), and Trunk Originated CSI (TO-CSI) subscriber information.

The class of service profile 210, however, does not define the address of any specific service platforms, but instead defines a generic placeholder address.

For example, the class of service profile 210 according to one embodiment replaces a service platform specific address with the generic placeholder address in the format:

{(MAPPING TYPE), $SP_1, \ldots, \ldots, SP_N$} where mapping type is a parameter indicating a mapping algorithm to be used; and
where $SP_1$ represents the address of a first service platform and $SP_N$ represents the address of an $N^{th}$ service platform. It should be noted, however, that the generic placeholder address is not limited to representing addresses of a fixed number of service platforms, as will be described further below.

The generic placeholder address, thus, identifies addresses of one or more specific service platforms. The mapping type parameter may be omitted if a default mapping algorithm is to be used.

Each HLR 204*a* and 204*b* further include a mapping module 208*a* and 208*b* respectively. In one embodiment the mapping modules 208*a* and 208*b* may implemented through appropriate computer programming instructions, or processing logic, executing on the computer on which their respective HLRs are running.

When a CAMEL subscriber attempts to register in an appropriate functional entity of a mobile network, such as in an MSC 102, the MSC 102 sends a registration request to the HLR with which the subscriber is associated. The registration request includes an identifier of the subscriber.

For example, if the subscriber 'B' attempts to register at the MSC 102, the MSC 102 requests the HLR 204*a* to provide it with the CSI data for subscriber 'B'.

Figure 3:
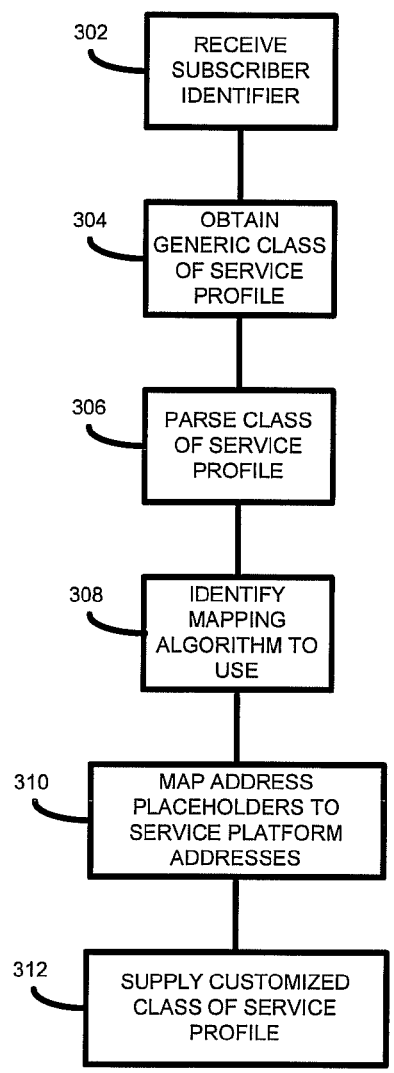
FIG. 3 is a flow diagram outlining example processing steps taken by a home location register according to an embodiment of the present invention.

Further reference will now be made to the flow diagram of FIG. 3.

The HLR 204*a* forwards the request to the mapping module 208*a* which receives (step 302) the request and subscriber identifier. The mapping module 208*a* obtains (step 304) the generic class of service profile 210 either from HLR 204*a* or from the centralized class of service profile store.

The mapping module 208*a* parses (step 306) the obtained class of service profile to identify any generic placeholder addresses therein. For each generic placeholder address found in the generic class of service profile the mapping module 208*a* determines (step 308) a mapping algorithm to use. If no mapping parameter is associated with a generic placeholder address a predetermined default mapping algorithm is be used. The mapping module 208*a* then replaces or substitutes (step 310) the generic placeholder address with an address or addresses as determined by the mapping module 208*a* in accordance with the determined mapping algorithm. The modified class of service profile is then sent (step 312) to the functional element having request it.

For example, if a generic placeholder address identified in the generic class of service profile was:

{I/, $@SP_1$, $@SP_2$, $@SP_3$, $@SP_4$}—@ is used to denote 'address' the mapping module 208*a* would determine that a mapping algorithm 'I' is to be used, and the service platforms identified are service platform 108*a*, 108*b*, 108*c*, and 108*n*. In the present embodiment mapping algorithm 'I' indicates that one of the identified service platforms is selected based on the subscriber identifier (such as the international mobile subscriber identity or IMSI). For example:

IMSI mod (4)

since four service platform addresses are specified in the generic placeholder address.

Depending on the IMSI of the registering subscriber, the mapping module 208*a* would either replace the generic placeholder address by the address of service platform 108*a*, 108*b*, 108*c*, or 108*d*. Mapping in this way ensures service platform affinity, which may be useful, for example, when the CAMEL service being provided is a pre-paid calling service.

In another example, a generic placeholder address may be:
{$@SP_1$, $@SP_2$, $@SP_3$, $@SP_4$}

In this case a default mapping algorithm is used, such as a 'round-robin' algorithm. Thus, the first time the mapping module 208*a* is used to map an address to the generic placeholder address the address of service platform 108*a* is chosen. The second time the address of service platform 108*b* is chosen, and so on.

In a further example, a generic placeholder address may be: {@SP$_1$, @SP$_2$, @SP$_2$, @SP$_3$}

In this case a default mapping algorithm is used, such as a 'round-robin' algorithm. Thus, the first time the mapping module 208*a* is used to map an address to the generic placeholder address the address of service platform 108*a* is chosen. The second and third time the address of service platform 108*b* is chosen, the fourth time the address of service platform 108*c* is chosen and so on. Such a generic placeholder address may be useful, for example, if service platform 108*b* has a greater capacity than service platforms 108*a*, 108*c*, and 108*n*, since half of all requests will be configured to use service platform 108*b*.

As can be seen the generic placeholder address provides a high level of flexibility. Furthermore, by centralizing or substantially reducing the number of full class of service profiles in the network 200 significantly reduces the burden and overhead of managing, configuring, and allocating CAMEL subscriber information for individual subscribers.

Although the embodiments described herein relating primarily to CAMEL subscriber information they are not limited thereto. For example, in further embodiments similar elements and techniques may be employed for use with other communication technologies, such as IP multimedia subsystem (IMS).

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method, in a communications network, of obtaining a set of subscriber information for a subscriber, comprising:
receiving, at a processor, a request to obtain a set of subscriber information for a subscriber;
obtaining, at the processor, a generic set of subscriber information that includes a generic placeholder address, wherein the generic placeholder address comprises a function; and
deriving, at the processor, from the generic set of subscriber information, the set of subscriber information for the subscriber that includes at least one service platform address for the subscriber,
wherein the deriving includes evaluating the function to identify the at least one service platform address for the subscriber.

2. The method of claim 1, wherein the request includes a subscriber identifier, and wherein the deriving further comprises evaluating the function through use of the received subscriber identifier.

3. The method of claim 1, further comprising substituting the generic placeholder address in the generic set of subscriber information with the identified at least one service platform address.

4. The method of claim 1, wherein the set of subscriber information is Customized Applications For Mobile Network Enhanced Logic (CAMEL) subscriber information (CSI) comprising at least one of: Originating CSI (O-CSI), Dialed Service CSI (D-CSI), Network Service CSI (N-CSI), Translation Information Flag CSI (TIF-CSI), Terminating CSI (T-CSI), VMSC Terminating CSI (VT-CSI), and Trunk Originated CSI (TO-CSI).

5. An apparatus to derive subscriber information for a subscriber, comprising:
processing logic to receive a request to obtain a set of subscriber information for a subscribe; and
a mapping module to:
obtain a generic set of subscriber information that includes a generic placeholder address, wherein the request includes a subscriber identifier, and the generic placeholder address includes a function; and
derive, from the generic set of subscriber information, the set of subscriber information that includes at least one service platform address for the subscriber through evaluation of the function to identify the at least one service platform address for the subscriber.

6. The apparatus of claim 5, wherein the mapping module is further to derive the set of subscriber information through use of the function and the received subscriber identifier.

7. The apparatus of claim 6, wherein the mapping module is to substitute the generic placeholder address with the at least one service platform address identified according to the function and the subscriber identifier.

8. The apparatus of claim 5, wherein the set of subscriber information is Customized Applications For Mobile Network Enhanced Logic (CAMEL) subscriber information (CSI) comprising at least one of: Originating CSI (O-CSI), Dialed Service CSI (D-CSI), Network Service CSI (N-CSI), Translation Information Flag CSI (TIF-CSI), Terminating CSI (T-CSI), VMSC Terminating CSI (VT-CSI), and Trunk Originated CSI (TO-CSI).

9. A non-transitory computer readable medium on which is stored machine readable instructions to obtain a set of subscriber information for a subscriber, the machine readable instructions comprising computer code to:
receive a request to obtain a set of subscriber information for a subscriber;
obtain a generic set of subscriber information including a generic placeholder address, wherein the received request includes a subscriber identifier, and the generic placeholder address includes a function; and derive, from the generic set of subscriber information, the set of subscriber information that includes at least one service platform address for the subscriber through evaluation of the function to identify the at least one service platform address for the subscriber.

* * * * *

UNITED STATES PATENT AND TRADEMARK OFFICE
CERTIFICATE OF CORRECTION

PATENT NO. : 8,331,913 B2
APPLICATION NO. : 12/508692
DATED : December 11, 2012
INVENTOR(S) : Mark Montz et al.

Page 1 of 1

It is certified that error appears in the above-identified patent and that said Letters Patent is hereby corrected as shown below:

In column 6, line 33, in Claim 5, delete "subscribe;" and insert -- subscriber; --, therefor.

Signed and Sealed this
Second Day of April, 2013

Teresa Stanek Rea
*Acting Director of the United States Patent and Trademark Office*